J. A. MacMAHON & J. T. WARDEN.
CAR FENDER.
APPLICATION FILED JUNE 13, 1912.
1,068,682.
Patented July 29, 1913.
3 SHEETS—SHEET 1.
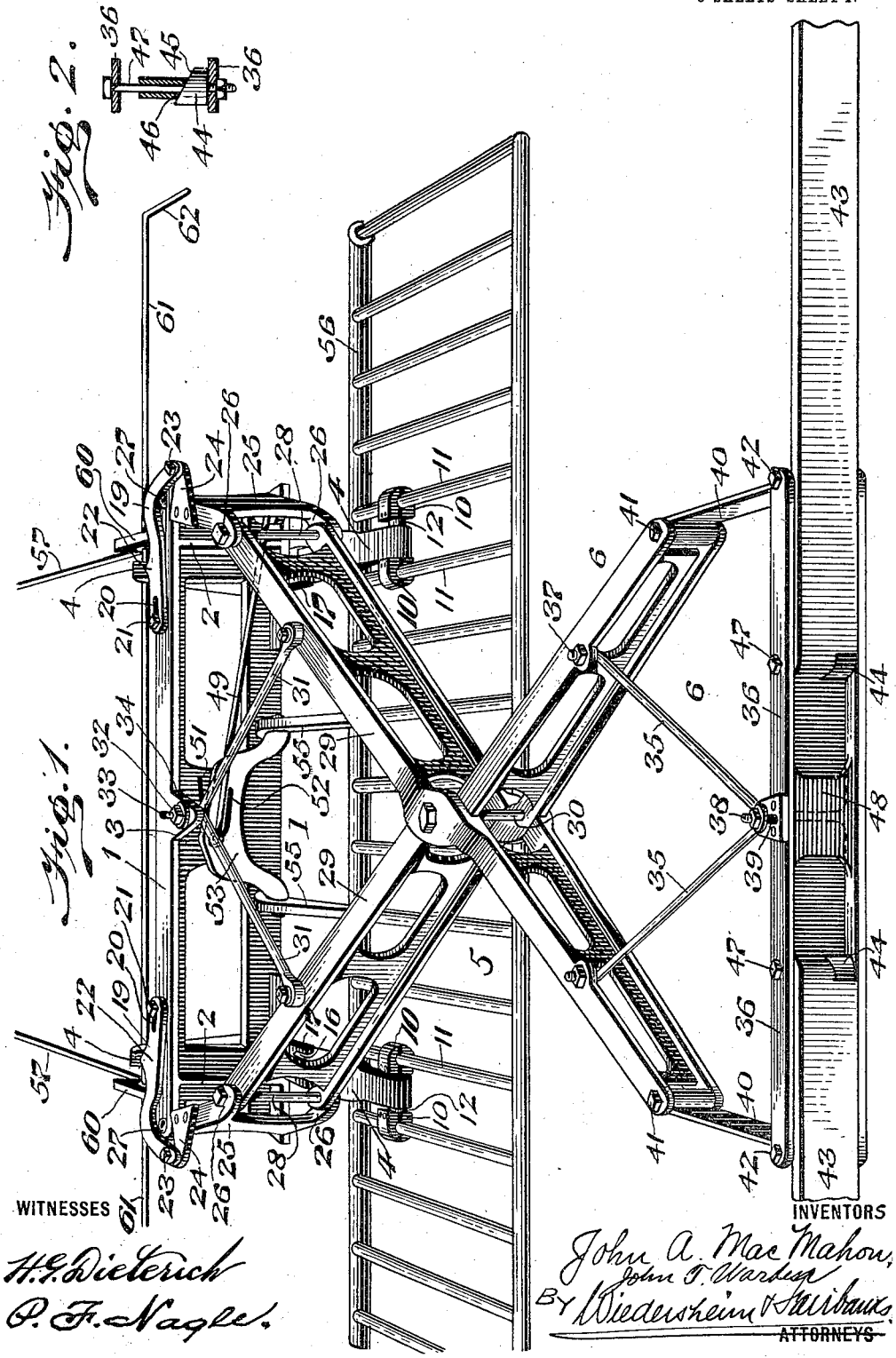
WITNESSES
H. G. Dieterich
P. F. Nagle.
INVENTORS
John A. MacMahon,
John T. Warden,
By Wiedersheim & Fairbanks
ATTORNEYS
COLUMBIA PLANOGRAPH CO., WASHINGTON, D. C.

J. A. MacMAHON & J. T. WARDEN.
CAR FENDER.
APPLICATION FILED JUNE 13, 1912.
1,068,682.
Patented July 29, 1913.
3 SHEETS—SHEET 2.
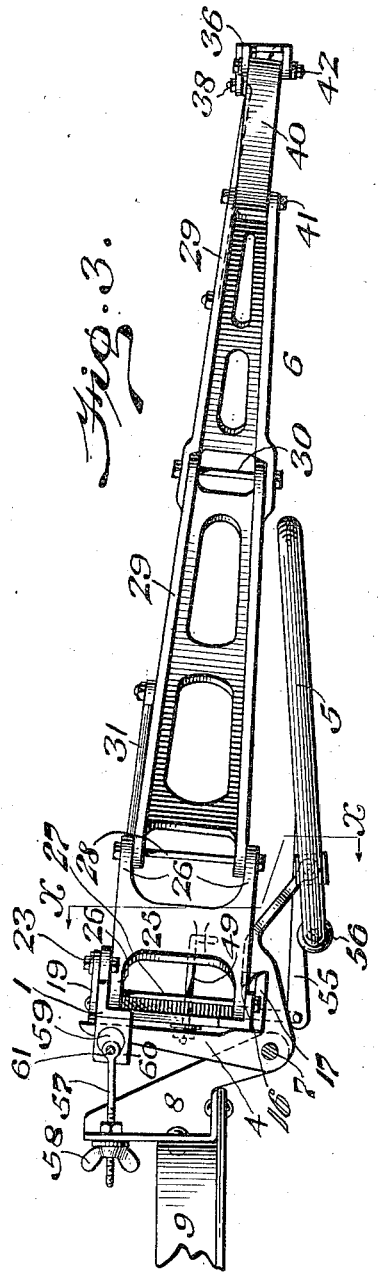
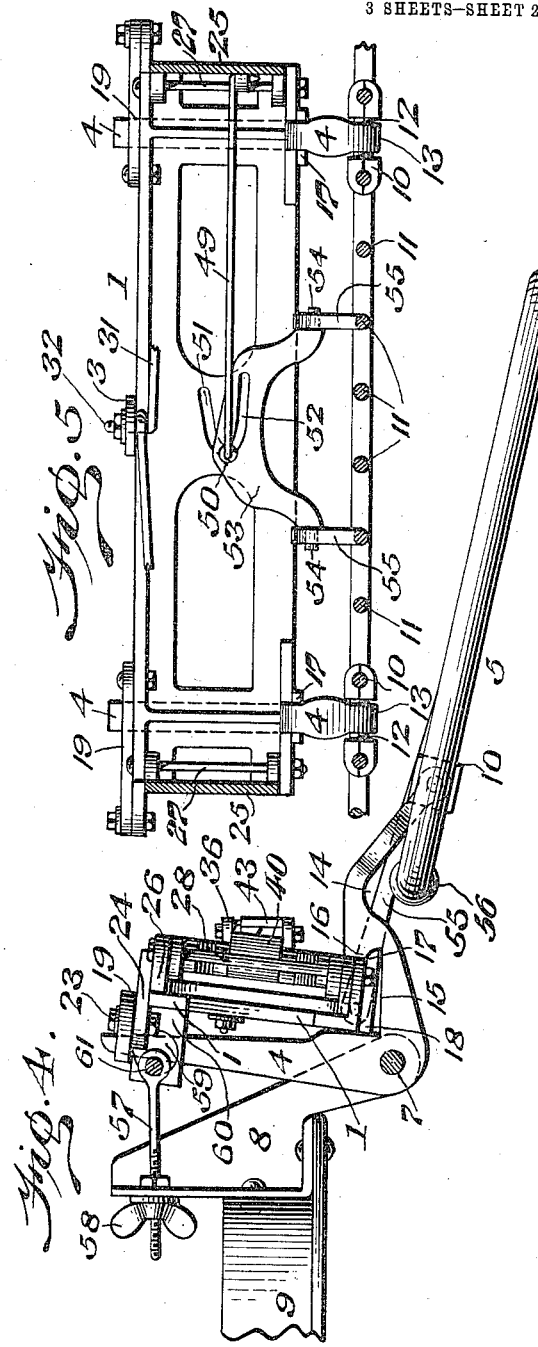
WITNESSES
H. G. Dieterich
O. F. Nagle
INVENTORS
John A. MacMahon,
John T. Warden
BY Wiedersheim & Fairbanks
ATTORNEYS

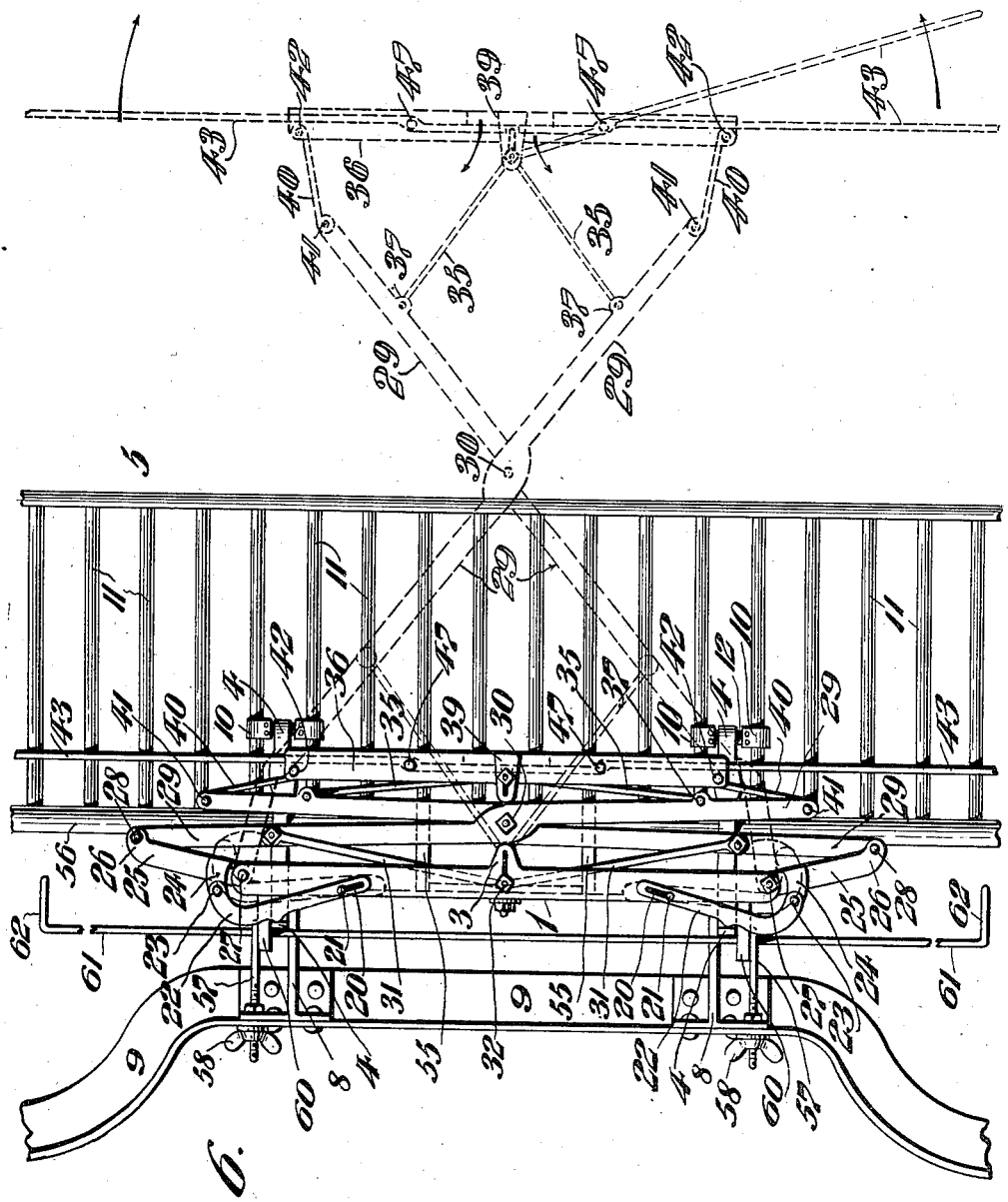

UNITED STATES PATENT OFFICE.

JOHN A. MacMAHON AND JOHN T. WARDEN, OF PHILADELPHIA, PENNSYLVANIA.

CAR-FENDER.

1,068,682.  Specification of Letters Patent.  Patented July 29, 1913.

Application filed June 13, 1912. Serial No. 703,578.

*To all whom it may concern:*

Be it known that we, JOHN A. MACMAHON, a subject of the King of Great Britain, and JOHN T. WARDEN, a citizen of the United States, both residing in the city and county of Philadelphia, State of Pennsylvania, have invented a new and useful Car-Fender, of which the following is a specification.

This invention relates to fenders adapted for use on power propelled vehicles, such as trolley cars and the like, and has for an object to provide a fender embodying a guard which is located beneath the body of the car, in front of the wheels and is normally maintained above the road-bed in a safe or inoperative position, the said guard being controlled through the medium of a collapsible trip which is positively connected thereto and positioned in the path of any object located on the track or in such position adjacent thereto as to eliminate the possibility of injury to such object.

It has for its further object to provide a trip which reduces to a minimum the impact of the trip with an object, and this is accomplished by providing a contractile trip which gives or retracts under the weight of an object in a direction reverse to that of a moving car to which the trip is attached. Further it will be noted that the object remains in contact with the trip until the latter has reached the end of its movement and the object is in safe position upon the guard which has been lowered through the movement of the trip. Attention is further directed to the fact that this trip, when retracted to its limit of movement, forms a barrier or rear wall for the guard, so that the object cannot pass over the guard under the car.

It has for a still further object to provide a guard and trip which are positively connected together in such a manner that the movement of one is instantly and simultaneously transmitted to the other, and the parts are so accurately balanced that movement of the trip lowers the guard to tripped and dropped position, and movement of the guard to normal position moves the trip to extended position. This latter action insures an automatic return of the trip to extended position and dispenses with any mechanism under the control of the operator of the car for effecting the return of the parts to normal position.

It further consists of other novel features of construction, all as will be hereafter fully set forth.

For the purpose of illustrating our invention, we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of these instrumentalities as herein shown and described.

Referring to the drawings: Figure 1 represents a perspective of a fender embodying our invention, the said perspective being taken from a point above the horizontal axis of the fender. Fig. 2 represents a detail, partly in section, of a portion of the trip. Fig. 3 represents a side elevation of the fender in normal position. Fig. 4 represents a side elevation showing the trip in collapsed position and the guard lowered to pick-up position. Fig. 5 represents a section on line $x$—$x$ Fig. 3. Fig. 6 represents a plan of the fender in closed position of the trip and showing in dotted lines the normal position of the parts.

Similar numerals of reference indicate corresponding parts in the figures.

1 designates generally the main frame of our novel fender and, in the present instance, is preferably formed of steel having reinforcing members 2 adjacent each end and a lug 3 positioned at substantially the middle portion of the frame for a purpose later described.

4 designates a pair of bell crank levers utilized as here shown for supporting the guard 5 and transmitting movement thereof, at certain times, to the contractile trip which is designated generally by reference numeral 6. These bell crank levers 4 are preferably pivoted at 7 to a suitable bracket 8 which is fixedly secured to the truck frame 9 of the car so that the fender mechanism follows the movement of the truck and is normally maintained in position over the car tracks. In order to properly distribute the weight of the guard 5 with respect to its coöperating adjuncts, the levers 4 are suitably spaced apart and respectively secured to the said guard by means of links 10 which are suitably joined to adjacent rods 11 of the guard 5, it being understood that the said rods form the body or supporting surface of the guard upon which an object is supported and maintained out of danger.

Each of the links 10 has a portion thereof formed as a bearing pin 12 upon which the apertured end 13 of each lever 4 is mounted for pivotal movement, thereby giving the desired swinging action between the parts. The levers 4 preferably pass upwardly from the links 10 and join the body portion of the said levers at such an angle as to provide a space 14 which gives sufficient clearance to permit the guard 5 to move on the bearing pins 12 as a pivot.

15 designates a seat formed in each lever 4 by recessing the upper edge thereof to a suitable depth and making a curved lateral cut to form a lip 16 which overhangs a portion of the seat 15 in order to receive the toe 17 of a block 18 so as to allow a rising and falling movement of the said block 18 upon the curved face of the lip 16 as a fulcrum. These blocks 18, in the present instance, are fixedly secured to the frame 1 and support the latter upon the pair of bell crank levers 4. As here shown the levers 4 extend in the rear of the frame 1 substantially parallel therewith and preferably project a suitable distance above the top of the said frame in order to be in the path of movement respectively of a pair of pivoted arms 19, and with which arms the said levers are normally maintained in contact through the weight of the guard 5.

The arms 19, in the present instance, are connected at one end to the frame 1 by means of a slot 20 and pin 21 connection in order that the required movements of the said arm may take place with respect to the frame 1. It will further be noted that each arm 19 has a cam face 22 formed thereon which seats against the projecting ends of the levers 4. The outer end of each of the arms 19 is pivotally secured by a pin or bolt 23 to a plate 24 which preferably forms a part of a yoke 25 and projects a suitable distance to one side thereof.

The yokes 25, in the present instance, are each provided with two pairs of ears 26 projecting from opposite sides thereof, one pair being pivoted at 27 to the main frame 1 and the other pair carrying a pin 28 upon which a girder member 29 is mounted for swinging movement toward and away from the frame 1. The girder members 29 are united at a point intermediate their ends by means of a bolt 30 which forms a pivot permitting the said members to swing with respect to each other on the said pivot, and it will be noted that one portion of each girder member is of smaller dimension than the corresponding portion of the other member, whereby the two members may be folded or swung together into substantially the same vertical plane, thereby occupying a minimum of space when in such position. It will furthermore be noted that when the girder members are swung together, as above described, they assume a position, due to the pivoted yoke construction, which is substantially parallel to the frame 1.

31 designates a pair of brace bars, the outer ends of which are connected respectively to one of the girder members 29, while the opposite ends thereof meet at a common point and are pivotally carried upon the bolt 32 which is mounted for sliding movement in the slot 33 of the lug 3. A suitable washer 34 or equivalent device is employed to permit the proper movement of the said bolt within its slot.

35 designates a second pair of brace bars preferably connecting the respective girder members 29 with a buffer frame 36, the connection at one end being by means of a bolt or pin 37 and at the opposite end with a bolt 38 common to both the bars 35 and mounted for sliding movement in the slot 39 formed in a portion of the buffer frame 36. This buffer frame 36 is preferably formed of light strong material and is supported at each end by an arm 40 carried by each girder member 29. In connection with these arms 40, it will be noted that they are each pivoted at 41 to their supporting girder member and at 42 have a pivotal connection with the trip frame 36, thereby forming a complete unitary compact folding or contractile trip element which normally projects beyond the forward end of the guard 5, but which when engaged by an object moves rearwardly and assumes a position at the rear of the guard 5 and substantially parallel with the frame 1.

43 designates a side wing pivoted adjacent each end of the frame 36 and normally extending laterally with respect thereto in order to effectually cover the track and ground adjacent thereto within the danger zone of the car. These wings 43 are pivoted to the frame 36 in such a manner that they will move in a direction opposite to the travel of the car and this construction is provided so that accidents may be avoided when the fender is on the rear of the car and not in use. The importance of this construction will be appreciated since when a car is rounding a curve these wings will project to one side of the car and may strike a person or object in their path of movement. The danger of injuring anyone so struck is entirely removed by employing a construction which will permit a yielding action of these wings which allows the object to pass by the end of the trip, after which the wings automatically return to normal position in alinement with the trip frame.

In order to carry out the action above described, we preferably provide a bushing 44 having a spiral inclined face 45 upon which a similar inclined face 46 of the trip wings 43 is seated. It will be understood that these bushings 44 are suitably fixed to the buffer frame 36 and that the pivot bolts 47, which secure the wings 43 to the frame 36, pass through the said bushings. The weight of the said wings 43 therefore automatically returns the wings to normal position after the above described movement, while movement in the opposite direction is prevented through the medium of an abutment 48 secured to the buffer frame 36 and in the rear of which one end of each of the wings 43 terminates. It will now be apparent that the contractile trip is composed of those elements designated by reference numerals 29 to 48 inclusive, though we do not of course wish to be limited to the exact number shown as it is obvious that an equivalent construction can be produced with more or less elements. We have, therefore, for the sake of clearness, designated the trip with the reference numeral 6, as aforesaid to prevent confusion and simplify the description.

The movement of the contractile trip 6 is utilized in a positive manner to actuate and throw the guard 5 to its operative position, the required movement being effected, in the present instance, by a rod 49 connected at one end to one of the movable yokes 25 and at the opposite end being fixed to a pin 50 which is mounted to travel within the slot 51 formed in the frame 1 and in the slot 52 formed in a forked link member 53. This link member 53 is provided with trunnions 54 which support respectively a bar 55 secured to the guard 5. It will thus be apparent that a movement of the yoke 25, due to a shifting of the trip member, will cause the rod 49 to draw the pin 50 along the cam slot 51 thus raising the rear portion of the guard 5 and causing the forward end of the same to be lowered to dropped position, this movement being affected by the co-operation or co-action of the slot 52.

It is preferable in the construction of the guard 5 to form the rear side or rear bar 56 thereof of heavier material than the forward portion of the same so that the action of gravity will not only tend to maintain the guard 5 in the position shown in Fig. 3, but also through the action of the bell crank levers 4, will cause the trip 6 to return to and be held in its extended position.

In order to adjust the height of the guard 5 and trip 6 from the track, we preferably provide a pair of threaded eye-bolts 57 which are fixed at one end to the main frame 1 and have their outer ends adjustably held by a portion of the bracket 8 through the medium of wing nuts 58 or like adjusting means. This adjustment determines the position of the trip and guard relative to the ground and may be readily actuated to vary the relation, if so desired.

It is desirable at certain times to raise both guard and trip to a supernormal position so that the entire fender structure will be rendered inoperative and permit the car to pass over obstructions on the track without causing the fender to move to drop position, and we provide in the present instance to accomplish this end, a pair of eccentrics 59, each of which is rotatably mounted in a block 60 of the main frame 1. A rod 61 is keyed or otherwise fixed to the eccentrics in order to cause the eccentrics to rotate as desired, the said rod passing transversely of the car body and terminating in a handle 62 which is placed at a convenient point for operation at the side of the car. In the present construction, we also have utilized this rod 61 as a support for the ends of the eye bolts 57 as the same can serve this purpose just as well as a separate connection for the said bolts.

In the operation of the device the parts are accurately adjusted with respect to the track and the trip and guard assume their normal position as shown in Fig. 3, the former extended with its contact end in close proximity to the track and substantially alined with the forward end of the car, while the latter is held raised away from the track. In this position the connections between the trip and the guard, together with the weight of the latter, are so accurately adjusted and balanced that the slightest force acting against the buffer frame 36 and wings 43, in a direction toward the main frame 1, will cause the trip 6 to move rearwardly and simultaneously swing the guard 5 about the pivotal support 12. The movements of the trip and guard are so accurately timed and related that the forward end of the guard 5 reaches the ground within an inappreciable interval after the trip has begun its movement, and it is therefore impossible not only for an object to get beneath the trip, but also for the said object to in any manner get beneath the guard member, and therefore the possibility of a person's arm or leg slipping beneath the guard is entirely obviated. The contractile action, which is substantially that of a lazy-tong structure should be particularly noticed, since as soon as the trip comes into contact with an object, the pressure of the latter causes the trip to move in the opposite direction from the direction of movement of the moving car and not only instantly lowers the guard, but continues its movement until the object is safely deposited upon the guard and the trip is folded in the position shown in Fig. 6. As soon as the object is removed from the fender the weight of the guard causes it to swing back to its former position and through the connections with the trip, automatically returns the latter to its forward extended position, thereby insuring the parts always being in correct location and relieving the motorman or car operator from giving any attention to the fender.

It will now be apparent that we have devised a novel and useful construction of a car fender which embodies the features of advantage enumerated as desirable in the statement of the invention and the above description, and while we have in the present instance shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described our invention, what we claim as new and desire to secure by Letters Patent, is:—

1. In a car fender, the combination of a guard pivotally mounted to swing from one position to another and a contractile trip operatively connected to control the movement of said guard.

2. In a car fender, the combination of a frame, a guard pivotally mounted thereon, and a contractile trip for moving said guard carried by said frame and having a free end projecting beyond said guard, said trip being adapted to move under pressure of an object in a direction reverse to that of a moving car carrying said trip.

3. In a car fender, the combination of a frame, a guard pivotally mounted on said frame, means to maintain said guard in raised or inoperative position, a contractile trip carried by said frame and normally projecting beyond said guard, and means to transmit movement of said trip to said guard whereby the latter is shifted to operative position.

4. In a car fender, the combination of a frame adapted to be adjustably mounted beneath a car body, a guard carried by said frame and adapted to move from one position to another, and an expansible, contractile trip operatively secured to said guard, said trip being expanded under the action of gravity and retracted under pressure of an object in the path thereof.

5. In a car fender, the combination of a frame adapted to be adjustably mounted beneath a car body, a guard carried by said frame and adapted to move from one position to another, an expansible, contractile trip movably mounted on said frame, means actuated by a movement of said trip to throw said guard to dropped position, and means actuated by gravity for returning said guard to normal position and expanding said trip.

6. In a car fender, the combination of a frame adapted to be adjustably supported beneath a car body, a guard pivotally carried by said frame and adapted to automatically assume the normal position through the action of gravity, a trip movably connected to said frame, comprising a lazy-tong structure adapted to normally assume an expanded position, and means to transmit movement of said trip to said guard to shift the latter to dropped position.

7. In a car fender, a combination of a frame adapted to be adjustably supported beneath the car body, a guard pivotally carried by said frame and adapted to automatically assume the normal position through the action of gravity, a girder member pivotally connected to each end of said frame, means to pivotally connect said girder members intermediate their ends, a trip frame pivotally carried by said girder members, and means operated during the contracting movement of said trip to shift said guard to dropped position.

8. In a car fender, the combination of a frame, a guard suitably mounted thereon to move from one position to another, and a trip connected to said guard to actuate the same and suitably mounted to travel from the forward end of a car to a point adjacent the rear of said guard and always remain in contact with the object causing operation of said trip.

9. In a car fender the combination of a guard pivoted beneath a car body, a contractile, extendible trip supported adjacent said guard and means connecting said guard and trip whereby movement of said trip to contracted position causes said guard to move to dropped position and the automatic return of said guard to normal position moves said trip to extended position.

JOHN A. MacMAHON.
JOHN T. WARDEN.

Witnesses:
ROBERT M. BARR,
C. D. McVAY.

Copies of this patent may be obtained for five cents each, by addressing the "Commissioner of Patents, Washington, D. C."